United States Patent Office 3,272,842
Patented Sept. 13, 1966

3,272,842
NOVEL PYRROLINONES
Nelson R. Easton and Robert D. Dillard, both of Indianapolis, Ind., assignors to Eli Lilly and Company, Indianapolis, Ind., a corporation of Indiana.
No Drawing. Filed June 25, 1965, Ser. No. 467,106
6 Claims. (Cl. 260—326.5)

This invention relates to certain novel pyrrolinones.

The compounds of this invention are useful in the treatment of crown gall, which is a manifestation in plants of the bacterial disease caused by the organism *Agrobacterium tumefaciens*. Crown gall is common to many nursery plants, in particular, roses, tomatoes, walnuts, apples, balsam, raspberries, and other plants of commercial importance. At the present time there are no commercial products useful against crown gall except the antibiotic streptomycin. The discovery of any simple, non-toxic, readily available compound useful against this disease, therefore, represents an important advancement in the art. The new compounds are also effective pre-emergent and post-emergent herbicides.

The compounds provided by the present invention can be represented by the following formula:

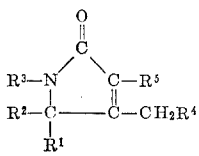

wherein $R^1$ and $R^2$, when taken alone, are lower alkyl, phenyl, or substituted phenyl containing no more than two substituents, said substituents being methyl, trifluoromethyl, or halo;

$R^1$ and $R^2$, when taken together with the carbon atom to which they are attached, complete a $C_5$–$C_8$ cycloalkyl ring;

$R^3$ is hydrogen, lower alkyl, $C_3$–$C_6$ cycloalkyl, lower alkoxy-lower alkyl, or tetrahydrofurfuryl;

$R^4$ is hydrogen, lower alkyl, phenyl, or naphthyl;

$R^5$ is phenyl, mono- or di-halo phenyl, phenoxy, mono- or di-halo phenoxy, phenylthio, mono- or di-halo phenylthio, naphthyl, mono- or di-halo naphthyl, naphthyloxy, mono- or di-halo naphthyloxy, naphthylthio, mono- or di-halo naphthylthio, or thienyl.

"Lower alkyl" as used herein refers to methyl, ethyl, n-propyl, isopropyl, n-butyl, isobutyl, sec.-butyl, or tert.-butyl.

"Lower alkoxy" refers to the lower-alkyl groups above, attached at any available position of the defined lower-alkyl group through an intervening oxygen atom. The groups thus include methoxy, ethoxy, n-propoxy, isopropoxy, n-butoxy, isobutoxy, sec.-butoxy, or tert.-butoxy.

"Halo" refers to fluoro, chloro, bromo, or iodo.

"$C_3C_6$ cycloalkyl" refers to cyclopropyl, cyclobutyl, cyclopentyl, or cyclohexyl.

"$C_5$–$C_6$ cycloalkyl" refers to cyclopropyl, cyclobutyl, cycloheptyl, or cyclooctyl.

Representative compounds provided by this invention include:

1-methoxyethyl-3 - phenoxy-4-benzyl-5,5 - diisopropyl-3-pyrrolin-2-one
1-tert.-butyl-3 - (1-naphthyloxy) - 4,5,5 - triethyl-3-pyrrolin-2-one
1-cyclobutyl-3 - [1-(4-chloronaphthyl)] - 4-(2-naphthyl)methyl-5,5-diethyl-3-pyrrolin-2-one
1-ethyl-3-(4-chlorophenoxy) - 4-ethyl-5,5 - dimethyl-3-pyrrolin-2-one
1-n-butyl - 3-(3-fluorophenyl)-4,5 - dimethyl - 5-isopropyl-3-pyrrolin-2-one
3-(4-fluorophenylthio) - 5-methyl - 4,5-diethyl-3-pyrrolin-2-one
3-(6-chloro - 2-naphthylthio)-4-methyl-5,5-diisopropyl-3-pyrrolin-2-one
1-isopropoxyethyl-3 - (2-bromo-5 - fluorophenyl) - 4-methyl-5-ethyl-5-isopropyl-3-pyrrolin-2-one
and the like.

The compounds of this invention can be made by the cyclization of the N-acyl derivatives of β-keto amines, said derivatives being disclosed in our co-pending application Serial No. 461,198, filed June 3, 1965. The cyclization is conveniently carried out in the presence of a strong base such as sodium or potassium hydroxide, or sodium or potassium alkoxide, typically in a non-aqueous solvent.

Representative examples of the N-acyl derivatives which can be cyclized include:

3-methyl-3-phenoxyacetamido-2-heptanone
3-isopropyl-4 - methyl-3 - (p-chlorophenoxyacetamido)-2-pentanone
3-tert. - butyl - 3 - (m-fluorophenoxyacetamido) - 2-pentanone
3-ethyl-4,4-dimethyl-3-(2-fluorophenoxyacetamido)-2-pentanone
1 - phenyl-3-methyl-3-(3,4-diiodophenoxyacetamido)-2-pentanone
1-(1-naphthyl)-3-methyl-3-(3-chloro-4-bromophenoxyacetamido)-3-pentanone
2 - methyl-2-(3,4-dichlorophenoxyacetamido)-3 - hexanone
3,6,8-trimethyl-6-phenoxyacetamido-5-nonanone
1-phenyl-3-ethyl-3-(N-cyclohexyl-2-chlorophenoxyacetamido)-2-pentanone
1 - (2-naphthyl)-3-ethyl-3-(N-ethoxyethyl-3-iodophenoxy-acetamido)-2-hexanone
3 - isobutyl-3-[N-(-methoxybutyl)-3-bromophenylthioacetamido]-2-heptanone
3 - methyl-3-[N-methyl-2-(4-bromophenoxy) acetamido]-2-butanone
3 - methyl-3-[N-methoxyethyl-2-(3-iodophenylthio) acetamido]-2-pentanone
N-(1-acetylcyclohexyl)-N-methyl-4-fluorophenoxyacetamide
N - (1-acetylcyclopentyl)-N-(3 - methoxy-2 - butyl)-2-(2,6-diiodo-1-naphthyloxy)acetamide
N - (1-caproylcyclooctyl) - N - tetrahydrofurfuryl-3,4-dichloro-2-naphthylthioacetamide

Example 1

A mixture of 25 g. of 3-methyl-3-(N-methylphenylacetamido)-2-butanone and 5 g. of potassium hydroxide, finely powdered (98% minimum assay) in 200 ml. of xylene was refluxed for 16 hours. After being cooled, the mixture was filtered and the filtrate distilled in vacuo, yielding 1,4,5,5-tetramethyl-3-phenyl-3-pyrrolin-2-one. Boiling point, 119–124° C. (0.05 mm. Hg). The product spontaneously crystallized and was recrystallized from ether-petroleum ether (boiling range, 30–60° C.). Melting point, 61–63° C.

*Analysis.*—Calcd. for $C_{14}H_{17}NO$: C, 78.10; H, 7.96. Found: C, 78.30; H, 7.96.

Example 2

Sixteen grams of sodium metal were dissolved in one liter of absolute ethyl alcohol at elevated temperature. The solution was cooled to room temperature, and 68 g. of 3-methyl-3-phenylacetamido-2-butanone were added dropwise. The resulting solution was stirred for 3 hours at ambient room temperature. One liter of water and one liter of chloroform were added, and the resulting two-layered mixture was separated. The chloroform layer was dried, the solvents removed, and the residue crystallized from benzene, yielding 35 g. of 4,5,5-trimethyl-3-phenyl-3-pyrrolin-2-one. Melting point, 180° C.

*Analysis.*—Calcd. for $C_{14}H_{15}NO$: C, 77.58; H, 7.51. Found: C, 77.31; H, 7.67.

In addition to the above compound, the following are several other examples of compounds prepared by the same procedure:

1,5,5-trimethyl -3- phenyl -4- ethyl -3- pyrrolin -2- one. Melting point, 155–160° C.

*Analysis.*—Calcd. for $C_{15}H_{19}NO$: C, 78.56; H, 8.35. Found: C, 78.64; H, 8.59.

1 - ethyl - 3 - phenyl-4,5,5-trimethyl-3-pyrrolin-2-one. Boiling point, 123–124° C./0.05.

*Analysis.*—Calcd. for $C_{15}H_{19}NO$: C, 78.56; H, 8.35. Found: C, 78.30; H, 8.33.

1,4,5-trimethyl -3- phenyl -5- ethyl -3- pyrrolin -2- one. Melting point, 58–60° C.

*Analysis.*—Calcd. for $C_{15}H_{19}NO$: C, 78.56; H, 8.35. Found: C, 78.46; H, 8.37.

3,5-diphenyl-4,5-dimethyl-3-pyrrolin-2-one. Melting point, 174–176° C.

*Analysis.*—Calcd. for $C_{18}H_{17}NO$: C, 82.10; H, 6.51. Found: C, 82.08; H, 6.52.

2-keto-3-phenyl-5-methyl-1-azaspiro [4.5] - $\Delta^3$-decene. Melting point, 240–242° C.

*Analysis*—Calcd. for $C_{16}H_{19}NO$: C, 79.63; H, 7.93. Found: C, 79.70; H, 7.76.

2 - keto-3-(4-chlorophenyl)-4-methyl-1-azaspiro [4.5]-$\Delta^3$-decene. Melting point, 251–253° C.

*Analysis.*—Calcd. for $C_{16}H_{18}ClNO$: C, 69.68; H, 6.57. Found: C, 69.47; H, 6.40.

2 - keto-3-(3,4-dichlorophenyl)- 4- methyl-1 - azaspiro [4.5]-$\Delta^3$-decene. Melting point, 227–229° C.

*Analysis.*—Calcd. for $C_{16}H_{17}Cl_2NO$: C, 61.94; H, 5.52. Found: C, 62.07; H, 5.53.

1,4-dimethyl-2-keto-3-phenyl-1-azapiro[4.5]-$\Delta^3$-decene. Melting point, 90–92° C.

*Analysis.*—Calcd. for $C_{17}H_{21}NO$: C, 79.96; H, 8.29. Found: C, 80.17; H, 8.32.

2-keto-3-phenyl-4 - methyl-1-azaspiro[4.6]-$\Delta^3$-undecene. Melting point, 218–219° C.

*Analysis.*—Calcd. for $C_{17}H_{21}NO$: C, 79.96; H, 8.29. Found: C, 80.15; H, 8.13.

2 - keto-3-phenoxy-4-methyl-1-azaspiro[4.5]-$\Delta^3$-decene. Melting point, 192–194° C.

*Analysis.*—Calcd. for $C_{16}H_{19}NO_2$: C, 74.68; H, 7.44. Found: C, 74.34; H, 7.40.

2 - keto - 3 - (3,4-dichlorophenoxy)-4-methyl-1-azaspiro [4.5]-$\Delta^3$-decene. Melting point, 214–216° C.

*Analysis.*—Calcd. for $C_{16}H_{17}Cl_2NO_2$: C, 58.90; H, 5.25. Found: C, 58.82; H, 5.22.

2 - keto - 3-(3,4-dichlorophenoxy)-4-methyl-1-azaspiro [4.5]-$\Delta^3$-decene. Melting point, 189–191° C.

*Analysis.*—Calcd. for $C_{16}H_{17}Cl_2NO_2$: C, 58.90; H, 5.25. Found: C, 58.85; H, 5.38.

2 - keto-3-(4-fluorophenoxy)-4-methyl-1-azaspiro[4.5]-$\Delta^3$-decene. Melting point, 235–237° C.

*Analysis.*—Calcd. for $C_{16}H_{18}FNO_2$: C, 69.80; H, 6.58. Found: C, 69.61; H, 6.59.

2 -keto-3-(4-bromophenoxy)-4-methyl-1-azaspiro[4.5]-$\Delta^3$-decene. Melting point, 207–209° C.

*Analysis.*—Calcd. for $C_{16}H_{18}BrNO_2$: C, 59.15; H, 5.39. Found: C, 59.28; H, 5.48.

2-keto-3- (4-chlorophenoxy) -1, 4-dimethyl-1-azaspiro [4.5]-$\Delta^3$-decene. Melting point, 132–134° C.

*Analysis.*—Calcd. for $C_{17}H_{20}ClNO_2$: C, 66.77; H, 6.59. Found: C, 66.98; H, 6.63.

2-keto-3- (3,4-dichlorophenoxy) -1, 4-dimethyl-1-azaspiro-[4.5]-$\Delta^3$-decene. Melting point, 118–120° C.

*Analysis.*—Calcd. for $C_{17}H_{19}Cl_2NO_2$: C, 60.01; H, 5.62. Found: C, 60.22; H, 5.77.

4, 5, 5-trimethyl-3- (4-chlorophenylthio) -3-pyrrolin-2-one. Melting point, 151–153° C.

*Analysis.*—Calcd. for $C_{13}H_{14}ClNOS$: C, 58.31; H, 5.26. Found: C, 58.08; H, 5.33.

4, 5, 5-trimethyl-3- (4-chlorophenyl) -3-pyrrolin-2-one. Melting point, 188–190° C.

*Analysis.*—Calcd. for $C_{13}H_{14}ClNO$: C, 66.24; H, 5.98. Found: C, 66.24; H, 6.20.

4, 5, 5-trimethyl-3- (3,4-dichlorophenyl) -3-pyrrolin-2-one. Melting point, 179–181° C.

*Analysis.*—Calcd. for $C_{13}H_{13}Cl_2NO$: C, 57.79; H, 4.85. Found: C, 57.80; H, 4.81.

4, 5, 5-trimethyl-3-phenoxy-3-pyrrolin-2-one. Melting point, 132–134° C.

*Analysis.*—Calcd. for $C_{13}H_{15}NO_2$: C, 71.86; H, 6.96. Found: C, 71.58; H, 6.98.

4,5,5-trimethyl-3-(4-chlorophenoxy)-3-pyrrolin-2-one. Melting point, 146–148° C.

*Analysis.*—Calcd. for $C_{13}H_{14}ClNO_2$: C, 62.03; H, 5.60. Found: C, 62.26; H, 5.80.

4,5,5 - trimethyl - 3 - (3,4 - dichlorophenoxy) - 3 - pyrrolin-2-one. Melting point, 149–151° C.

*Analysis.*—Calcd. for $C_{13}H_{13}Cl_2NO_2$: C, 54.56; H, 4.57. Found: C, 54.73; H, 4.63.

4,5,5 - trimethyl - 3 - (2,4 - dichlorophenoxy) - 3 - pyrrolin-2-one. Melting point, 127–129° C.

*Analysis.*—Calcd. for $C_{13}H_{13}Cl_2NO_2$: C, 54.56; H, 4.57. Found: C, 54.79; H, 4.77.

4,5,5 - trimethyl - 3 - (4 - bromophenoxy) - 3 - pyrrolin-2-one. Melting point, 153–155° C.

*Analysis.*—Calcd. for $C_{13}H_{14}BrNO_2$: C, 52.72; H, 4.76. Found: C, 52.50; H, 4.78.

4,5,5 - trimethyl - 3 - (4 - fluorophenoxy) - 3 - pyrrolin-2-one. Melting point, 139–141° C.

*Analysis.*—Calcd. for $C_{13}H_{14}FNO_2$: C, 66.37; H, 5.99. Found: C, 66.51; H, 6.02.

1,4,5,5 - tetramethyl - 3 - phenoxy - 3 - pyrrolin - 2-one. Melting point, 64–66° C.

*Analysis.*—Calcd. for $C_{14}H_{17}NO_2$: C, 72.70; H, 7.40. Found: C, 72.92; H, 7.64.

1,4,5,5 - tetramethyl - 3 - (3,4 - dichlorophenoxy) - 3-pyrrolin-2-one. Melting point, 85–87° C.

*Analysis.*—Calcd. for $C_{14}H_{15}Cl_2NO_2$: C, 56.01; H, 5.03. Found C, 55.86; H, 5.25.

1,4,5,5 - tetramethyl - 3 - (2,4 - dichlorophenoxy) - 3-pyrrolin-2-one. Melting point, 111–114° C.

*Analysis.*—Calcd. for $C_{14}H_{15}Cl_2NO_2$: C, 56.01; H, 5.03. Found: C, 56.29; H, 5.27.

3 - thienyl - 4,5,5 - trimethyl - 3 - pyrrolin - 2 - one. Melting point, 190–192° C.

*Analysis.*—Calcd. for $C_{11}H_{13}NOS$: C, 63.73; H, 6.32. Found: C, 63.98; H, 6.31.

3 - thienyl - 1,4,5,5 - tetramethyl - 3 - pyrrolin - 2 - one. Melting point, 62–64° C.

*Analysis.*—Calcd. for $C_{12}H_{15}NOS$: C, 65.12; H, 6.83. Found: C, 65.33; H, 6.96.

The compounds of the present invention, when used to control crown gall, can be applied to the infected plant or they can be used prophylactically. For example, a suspension of the compound in water in a concentration of from about 2 parts per million to about 40 parts per million can be sprayed onto the ground at the base of the plant or onto the growing plant in an amount great enough to thoroughly drench the foliar parts of the plant and drip therefrom, thereby soaking the earth surrounding the crown of the plant. Alternatively, the compound in an aqueous suspension or dry powder formulation at 2 to 40 parts per million can be used as a dip for the seedlings during transplanting operations.

Concentrations of about ½ to about 8 pounds of the compounds of this invention per acre of soil can be used to prevent the invasion of certain monocotyledonous and dicotyledonous plants and weeds in lawns, gardens, and fields. The compounds, with or without an inert carrier, should be distributed evenly on the soil and can be incorporated, if desired, by methods well known in the art.

The compounds are also phytotoxic to certain mature dicotyledonous plants and can thus be used as a selective herbicide to control the spread of these plants. If used in this way, they should be applied to the leaves of the plant at concentrations of about 1 to about 8 pounds per acre.

We claim:
1. A compound of the formula

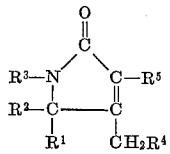

wherein
- $R^1$ and $R^2$, when taken alone, are members of the group consisting of lower alkyl, phenyl, mono-substituted phenyl, and di-substituted phenyl, the substituents being of the group consisting of methyl, trifluoromethyl, and halo;
- $R^1$ and $R^2$, when taken together with the carbon atom to which they are attached, complete a $C_5$–$C_8$ cycloalkyl ring;
- $R^3$ is a member of the group consisting of hydrogen, lower alkyl, $C_3$–$C_6$ cycloalkyl, lower-alkoxy-lower alkyl, and tetrahydrofurfuryl;
- $R^4$ is a member of the group consisting of hydrogen, lower alkyl, phenyl, and naphthyl; and
- $R^5$ is a member of the group consisting of phenyl, mono- and di-halo phenyl, phenoxy, mono- and di-halo phenoxy, phenylthio, mono- and di-halo phenylthio, naphthyl, mono- and di-halo naphthyl, naphthyloxy, mono- and di-halo naphthyloxy, naphthylthio, mono- and di-halo naphthylthio, and thienyl.

2. 1,5,5 - trimethyl - 3 - phenyl - 4 - ethyl - 3 - pyrrolin-2-one.

3. 4,5,5 - trimethyl - 3 - (4 - chlorophenylthio) - 3-pyrrolin-2-one.

4. 4,5,5 - trimethyl - 3 - (3,4 - dichlorophenyl) - 3-pyrrolin-2-one.

5. 4,5,5 - trimethyl - 3 - (2,4 - dichlorophenoxy) - 3-pyrrolin-2-one.

6. 3 - (2 - thienyl) - 1,4,5,5 - tetramethyl - 3 - pyrrolin-2-one.

No references cited.

ALEX MAZEL, *Primary Examiner.*

HENRY R. JILES, *Examiner.*

JOSEPH A. NARCAVAGE, *Assistant Examiner.*

UNITED STATES PATENT OFFICE
CERTIFICATE OF CORRECTION

Patent No. 3,272,842                            September 13, 1966

Nelson R. Easton et al.

It is hereby certified that error appears in the above numbered patent requiring correction and that the said Letters Patent should read as corrected below.

Column 1, line 60, for " "$C_5$-$C_6$ cycloalkyl" refers to cyclopropyl, cyclobutyl," read -- "$C_5$-$C_8$ cycloalkyl" refers to cyclopentyl, cyclohexyl, --; column 2, line 31, for "3-pentanone" read -- 2-pentanone --; column 3, line 55, for "(3,4-dichlorophenoxy)" read -- (2,4-dichlorophenoxy) --.

Signed and sealed this 1st day of August 1967.

(SEAL)
Attest:

EDWARD M. FLETCHER, JR.                      EDWARD J. BRENNER
Attesting Officer                               Commissioner of Patents